Aug. 21, 1923.
J. A. HOWE
RECORDING MACHINE
Filed Sept. 24, 1921
1,465,441
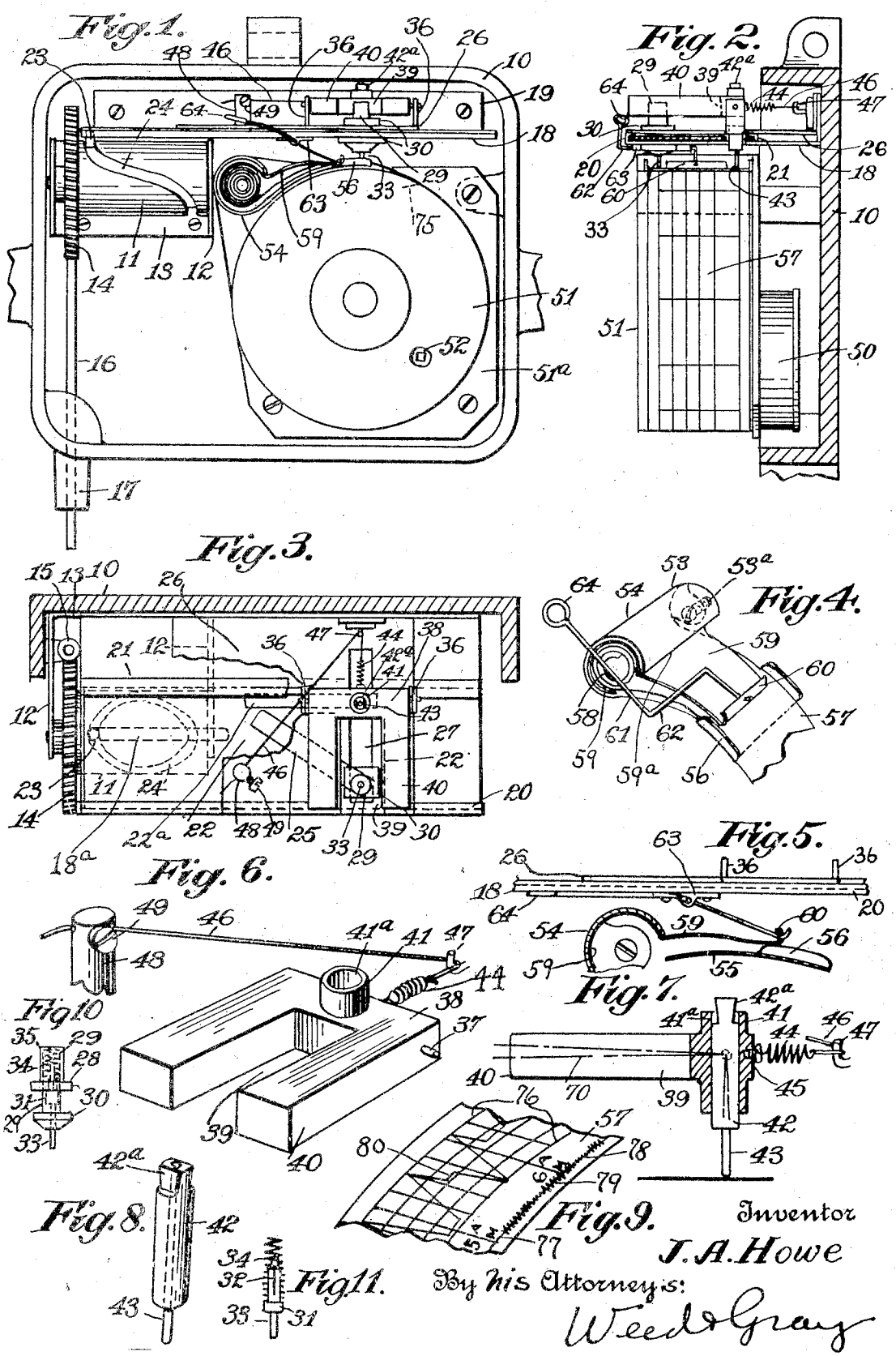

Patented Aug. 21, 1923.

1,465,441

UNITED STATES PATENT OFFICE.

JUNIUS A. HOWE, OF BROOKLYN, NEW YORK, ASSIGNOR TO REGISTRAR SERVICE CORPORATION, OF NEW YORK, N. Y., A CORPORATION OF NEW YORK.

RECORDING MACHINE.

Application filed September 24, 1921. Serial No. 503,057.

*To all whom it may concern:*

Be it known that I, JUNIUS A. HOWE, a citizen of the United States, residing at Brooklyn, in the county of Kings and State of New York, have invented certain new and useful Improvements in Recording Machines, of which the following is a specification.

This invention relates to recording machines particularly adapted for use with motor vehicles, such as automobiles or automobile trucks, an object thereof being to provide an improved recording machine or register which will accurately and efficiently record the mileage or distance traveled by the vehicle, the velocity or rate of speed at which the vehicle is driven at any or all predetermined times, the periods during which the vehicle is standing still and the engine running or stopped, and also the periods during which the vehicle is in motion and the engine running. As a result of this invention therefore, it is possible to obtain a complete and accurate record in a graphical manner of the entire use and operation of the vehicle or other body in connection with which the machine is used.

A further object of this invention is to provide a recording machine or register having means for graphically representing the velocity at which the vehicle travels, and a novel vibratory means for graphically representing and recording the use and operation of the vehicle, the same comprising a vibratory member and a marker or stylus controlled thereby, the vibratory member being pivotally mounted in a nonequilibrious manner and having resilient or flexible means for counterbalancing or supporting the same whereby the vibrations of the body will impart oscillatory or vibratory movements to the vibratory member such movement being defined by the tension of the counterbalancing or supporting means.

A further object of this invention is to provide a recording instrument having means for graphically representing upon a movable record tape or the like the use and operation of the vehicle or other body in connection with which the instrument is used and a combined record holder and marking or recording table so constructed as to prevent injury to the marker during the operation of the instrument, the same being provided with novel means for guiding the record or tape and a novel adjustable tape tensioning means.

A further object of this invention is to provide a recording machine or register, which will be comparatively simple in construction, durable, serviceable and efficient in use, comparatively economical to manufacture and adapted to be used in various relations for accurately accomplishing the purposes in connection with which it may be utilized.

Other objects of this invention will appear in the following description thereof, reference being had to the accompanying drawing, forming a part of this specification, wherein like reference characters indicate corresponding parts in the several views and wherein Fig. 1 is a front elevation, parts being removed in order to disclose the mechanism; Fig. 2 is an end view partly in section of the structure illustrated in Fig. 1; Fig. 3 is a top plan view partly in section; Fig. 4 is a fragmentary perspective view of the combined tape holder and marking tape together with the tape tensioning device; Fig. 5 is a fragmentary side view partly in section illustrating the operation of the tape tensioning device; Fig. 6 is a perspective view of the vibratory member; Fig. 7 is a side view partly in section of the vibratory member and the marker; Fig. 8 is a detailed view of the marker; Fig. 9 is a fragmentary view of a record tape; and Figs. 10 and 11 are detail views of the movable marker.

Referring to the drawing, wherein I have illustrated a preferred embodiment of my invention, it will be seen that my improved recording machine comprises a suitable casing 10 adapted to receive and support the recording mechanism. This mechanism includes cam controlled operating means comprising in the present instance a cam 11 pivotally mounted for rotary movement in suitable frame bearings or bearing brackets 12 secured by means of a supporting plate 13 to the rear of the casing. The cam 11 carries adjacent to one end thereof a worm gear 14 cooperating with a worm 15 carried by and operating shaft 16 mounted in a bearing 17 extending from the casing. The shaft 16 is adapted to be connected in any desired manner to a vehicle wheel, similar to the usual connection for a speed meter, and as a result thereof the cam 11 in operation will be rotated at a predetermined rate of speed.

A horizontal supporting shelf 18 is mounted in the casing and supported as by means of a flanged plate 19 as illustrated in Fig. 1. This shelf is provided in any suitable manner with inturned guide flanges 20 and 21 spaced from each other a suitable distance apart, the same together with the shelf 18 forming a guideway adapted to receive for shiftable movement a reciprocating slide 22. Adjacent to its rear end slide 22 is provided with a depending pin 23 extending into and cooperating with a cam groove 24 formed on the cam 11. Thus, it will be seen that upon rotating the cam 11 the pin 23 will follow the path of the cam groove and as a result thereof the slide member 22 will be shifted or reciprocated upon the guide member 18 and between the guide flanges 20 and 21. The guide plate 18 is provided with a slot 18ª shown in Fig. 3 for the purpose of permitting reciprocatory movement of the pin 23.

As clearly shown in Fig. 3, the slide 22 is provided with a diagonal slot 25 for the purpose of imparting transverse and progressive movement to a marker as hereinafter described. A supporting plate 26 of any preferred form is mounted above the guides 20 and 21 and secured in any preferred manner to the plate 19. A transverse slot 27 is cut in the plate 26 and a pencil carrier or marker 28 having a tubular portion or hollow stem 29 of suitable diameter is adapted to cooperate with the slot 27 and the diagonal cam slot 25, the marker being also provided with an upper flange 30 for supporting the same upon the plate 26 and a lower flange 30 cooperating with or impinging against the underside of the guide plate 18. Thus, it will be readily seen that upon reciprocating the slide member 22 the marker 28 will be reciprocated by virtue of the diagonal cam slot 25 in a plane transverse thereto, or in other words, will be shifted back and forth in the transverse slot 27. As illustrated in Fig. 3, the slide 22 is provided with a slot 22ª of suitable length to permit free movement of the slide relatively to a marker 42 hereinafter described.

In its preferred form the marking device carried within the hollow stem 29 comprises, as illustrated in Fig. 11, a suitable holder 31 having a suitable bore therethrough for receiving a pencil lead 33, the lead being held in position by means of slotted gripping fingers 32. A coil spring 34 is slipped over the gripping fingers 32 whereupon the holder is inserted in the stem 29, and a cap or closure 35 forced down over the spring. Thus, the pencil lead or stylus 33 will be resiliently controlled and will at all times during operation be firmly held against the recording tape by virtue of the continuous tension exerted by the spring 34 between the body 31 of the holder and the top of the cap 35.

Extending upwardly from the supporting plate 26 are a pair of suitable supports 36 located in spaced relation for pivotally carrying therebetween a vibratory member 38 having pivots 37 adjacent to one end thereof mounted in the supports 36. This vibratory member is thus mounted, as clearly shown in a non-equilibrious manner, the preponderance of weight thereof lying forwardly of the pivots 37. The vibratory member, in order to permit reciprocation of the pencil carrier 28, is cut away or bifurcated as at 39 to form forwardly extending arms 40. The vibratory member 38 is provided adjacent to its rear end, preferably with an integrally formed pencil guide 41 having a bore 41ª for freely receiving a vibratory marker 42, the latter being supported by virtue of its own weight and independently of the vibratory member 38. As illustrated in Fig. 7 the pivotal axis of the vibratory member 38 passes through the central longitudinal axis of the marker 42, the latter having a suitable bore therethrough for receiving a pencil lead or stylus 43, it being cut away at 42ª at its upper end for permitting convenient manipulation of the marker for inserting or withdrawing the same.

In order to counterbalance the weight of the vibratory member 38 yieldable means is provided for supporting the same, which means also includes in its length resilient means and having connections for predetermined self-adjustment. This means for counterbalancing or supporting the weight of the vibratory member comprises a flexible cord 46 formed of any suitable strong material, such as gut, having at one end thereof a spring 44 connected or secured as at 45, to the inner end of the vibratory member 38. The flexible supporting means 46 is passed around a pin or staple 47 carried at the rear of the casing, and is held in adjusted position by means of a binding post 48 and a set screw 49.

Mounted upon a supporting plate 51ª carried by the casing 10 is a suitable clock mechanism, 50. Adapted to be rotated thereby in a predetermined manner and suitably connected to the driving arbor thereof is a reel or tape carrier 51. The latter is provided with an opening 52 to permit the clock mechanism to be wound. Secured to the supporting plate 51ª, as by means of a set screw 53ª is a combined record or tape holder and marking table comprising, as illustrated in the present instance, a partially coiled holder 54 and an integral forwardly extending supporting table 55 spaced slightly from the outer periphery of the drum or reel 51, and its forward end is provided at either side with upturned or integral guide members 56 adapted for the purpose of restricting lateral movement of the tape 57 as it is wound from a coiled position or roll 58 within the holder 54 over the periphery of the reel 51. In order to hold the tape in operation firmly upon the marking table, an adjustable or releasable tensioning device is provided, which comprises a flat spring 59 partially coiled so as to be resiliently held within the holder 54, the forward portion thereof resiliently bearing against the tape and having an upturned flange 60 for receiving the end of a bent releasing pin or lever 61, the horizontal shank 62 thereof being held in suitable bearing brackets 63, thereby forming a fulcrum to permit sufficient leverage for moving the spring 59 to various operative or inoperative positions. Thus, it will be seen that upon manipulating the handle 64 of the releasing pin 61, the tensioning spring 59 may be released from contact with the recording tape 57 as illustrated in Fig. 5, the headed or eye-formed end 64 of this releasing lever being adapted to be inserted or caught underneath the edge of the plate 18, thereby retaining the tensioning spring 59 in the position illustrated in Fig. 5. The constant tension of the spring 59 exerted against the upper coiled edge 59ª of the holder 54 will at all times tend to force the spring to the operative position illustrated in Fig. 4 or Fig. 1.

The recording tape is adapted to be inserted in the form of a roll into the open end of the holder 54, and passes therefrom over the marking table 55 between the guides 56 and underneath the tension spring 59, the forward end 75 of the tape as shown in Fig. 1 being preferably inserted into a slit in the upper surface of the reel 51. The tape, as illustrated in Fig. 9, may be divided by transverse lines into suitable spaces representing the hours or the sub-divisions thereof. The length of the cam groove 24 represents a given mileage, such as two miles, whereby upon one complete revolution of the cam 11 slide 22 is reciprocated once, thereby reciprocating the marker 28 between the longitudinal lines 76 on the record tape, so that the travel of the pencil across the tape represents a movement of one mile.

The vibratory pencil 43 is mounted so as to travel substantially over the longitudinal line 77 on the record tape. Inasmuch as the marker bears upon the tape by its own weight, the same will make substantially no mark upon the tape when the vehicle is not in motion and the engine thereof is stopped.

Upon starting the engine, however, the slight vibrations imparted thereby to the vehicle will cause the vibratory member 38 to vibrate against the yieldable or flexible support 46 thereby imparting slight vibrations to the pencil, which are graphically recorded by the line 78 illustrated in Fig. 9. When the vehicle is in motion however, the vibration thereof will be increased considerably, whereby the vibratory movement of the pencil 43 will be increased as indicated by the line 79 in Fig. 9. Thus, it will be seen that I have provided an improved vibratory member, which will be sensitive to the slightest movement of the vehicle and will be ineffective or inoperative only when the vehicle is absolutely stationary, the same being controlled by a counterbalanced or flexibly supported vibratory member, but freely or slidingly engaging the vibratory member so as to bear upon the tape by its own weight. As a result of this construction, the record obtained by the marker 43 will be accurate at all times, and will correctly represent the time during which the vehicle is stationary, the time during which the vehicle is not in motion but the engine running, and the time during which the vehicle is in motion and the engine running. The dotted lines 70 in Fig. 7 indicate the positions of the marker 42 and the vibratory member 38 when the latter is vibrated, the member 38 having a swinging oscillatory movement, which is compensated by the free slidable movement of the marker 42 in the tube or bore 41ª.

Of course it will be understood that by virtue of the continuous operation of the clock mechanism, the reel or drum 51 will constantly rotate thereby continuously winding the tape thereon, and at a predetermined rate of speed irrespective of whether the engine is running and the vehicle in motion. As a result thereof, it will be readily seen in the graphical representation shown in Fig. 9, that the longitudinal lines 80 made by the marker 28 represent the time during which the vehicle is stationary irrespective of whether the engine is running or not. When the vehicle is not in motion and the engine stopped, no mark will be made by the marker 42, as indicated at 77, in Fig. 9.

It will be seen that I have provided, among other things, a novel combined tape holder and marking table having integral means for guiding the tape thereover, and releasable adjustable tape tensioning means carried by the holder independently thereof. The spaced guides 56 limit any transverse movement of the tape caused by the transverse movements of the markers bearing thereupon. The tendency of the markers is to shift the tape sidewise therewith, thus resulting in inaccurate records. This is prevented however by means of guides 56. The purpose of the marking table is to prevent the breaking of the marker or pencil leads, which is particularly liable to occur during the operation of an instrument where the marker operates directly upon the rotatable or movable carrier or reel. In many devices of this type a slot or slit is provided in the carrier or drum, into which the end of the tape is fastened or inserted and during the rotation of the carrier when the slit passes under the marker the lead contacts therewith, and is often broken. By virtue of the lever 61, the releasable tensioning spring 59 may be shifted to inoperative position and readily held in such position at any predetermined time, particularly when it is desired to replace the tape rolls in the tape holder.

It is to be understood that by describing in detail herein any particular form, structure, or arrangement, it is not intended to limit the invention beyond the terms of the several claims or the requirements of the prior art.

I claim as my invention:

1. In a recording machine the combination of a marking instrumentality held down by substantially its entire weight, vibratory means therefor having means for guiding said marking instrumentality so that it will be freely movable relative to said vibratory means, and record supporting means effective to support a record in position to be engaged by the marking instrumentality and to maintain said marking instrumentality against displacement relatively to said vibratory means.

2. In a recording machine, the combination of vibratory means pivotally mounted in a non-equilibrious manner for swinging movement toward and from the record-receiving means, a recording marker slidingly engaging said vibratory means, and resilient means for counterbalancing said vibratory means.

3. In a recording machine, the combination of supporting means, vibratory means pivotally connected thereto, and a slidable recording marker acted upon by said vibratory means at the pivotal axis thereof.

4. In a recording machine, a vibratory member, means for pivotally supporting the same, a marking device shiftably engaged thereby and extending substantially thru the pivotal axis of said vibratory member.

5. In a recording machine the combination of a continuously movable carrier, a record holder supported adjacent thereto and having a marking table extending above said carrier, a record tensioning spring carried by said holder and adapted to engage the record, and a handle member for shifting said spring out of engagement with the record and for releasably locking the spring in such position.

6. In a recording machine, the combination of a continuously movable carrier for a record receiving means, a record holder supported adjacent thereto and a marking table extending therefrom, a recording marker engaging said record receiving means and movable transversely thereupon, and spaced guides carried by said table and adapted to limit any sidewise movement of the record receiving means caused by the transverse movement of the marker.

7. In a recording machine, the combination of a tape holder, a record tape carried thereby, carrier means for said record tape and movable in a predetermined path, a marker coacting with said tape, a slide cooperating with said marker and movable to shift the same in a plane transverse to the plane of movement thereof, camming means for operating said slide, a vibratory member, and a second marker slidably engaging said vibratory member.

8. A recording machine having a pivotally mounted vibratory member, and a marker freely engaging said vibratory member and extending thru the same at substantially the pivotal axis thereof.

9. In a recording machine the combination of a record holder, a movable carrier, and record tensioning means, said holder and tensioning means having cooperating coiled portions.

10. In a recording machine, the combination of a movable marker, a slide co-acting therewith, camming means for reciprocating said slide thereby to reciprocate said marker in a plane transverse thereto, a vibratable arm and a marker shiftably engaged thereby.

11. In a recording machine the combination of record receiving means adapted to be shifted in a predetermined path, a floating marker bearing on said means by its own weight, and a vibratory member slidably engaging said marker.

12. In a recording machine the combination of a vibratory member, means for pivotally supporting the same, a marker controlled by said member, and resilient means for counterbalancing said member and acting in a direction transverse to the vibratory movement thereof.

13. In a recording machine the combination of supporting means, vibratory means pivoted thereto, and a recording marker having the longitudinal axis thereof substantially intersecting the pivotal axis of said vibratory means.

Signed at 1822 Park Row Building, New York city, New York, this 23rd day of September, 1921.

JUNIUS A. HOWE.